United States Patent
Mitake et al.

(10) Patent No.: US 9,184,473 B2
(45) Date of Patent: Nov. 10, 2015

(54) TEMPERATURE CONTROL METHOD AND TEMPERATURE CONTROLLER

(75) Inventors: Masaya Mitake, Hiroshima (JP); Katsuaki Morita, Hiroshima (JP); Hiroshi Ogawa, Mihara (JP); Tetsuo Takata, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 785 days.

(21) Appl. No.: 13/139,146

(22) PCT Filed: Sep. 17, 2009

(86) PCT No.: PCT/JP2009/066219
§ 371 (c)(1),
(2), (4) Date: Jun. 13, 2011

(87) PCT Pub. No.: WO2010/103685
PCT Pub. Date: Sep. 16, 2010

(65) Prior Publication Data
US 2012/0019060 A1    Jan. 26, 2012

(30) Foreign Application Priority Data
Mar. 10, 2009 (JP) .................. 2009-056357

(51) Int. Cl.
*B60L 11/00* (2006.01)
*H01M 10/44* (2006.01)
(Continued)

(52) U.S. Cl.
CPC .......... *H01M 10/44* (2013.01); *B60L 11/1872* (2013.01); *B60L 11/1875* (2013.01);
(Continued)

(58) Field of Classification Search
CPC .............. B60L 11/187; B60L 11/1872; B60L 11/1874; B60L 11/1875
See application file for complete search history.

(56) References Cited

U.S. PATENT DOCUMENTS

| 4,313,080 A * | 1/1982 | Park .............................. 320/123 |
| 7,015,676 B2 * | 3/2006 | Kohama et al. ................ 320/150 |

(Continued)

FOREIGN PATENT DOCUMENTS

| JP | 2005-130559 A | 5/2005 |
| JP | 2007-202335 A | 8/2007 |
| JP | 2008-245485 A | 10/2008 |
| TW | 554847 U | 9/2003 |

OTHER PUBLICATIONS

Sarasua, Molina & Mercado. Dynamic Modelling of Advanced Battery Energy Storage System for Grid-Tied AC Microgrid Applications. doi: 10.5772/52219.*

(Continued)

*Primary Examiner* — Jared Fureman
*Assistant Examiner* — Joel Barnett
(74) *Attorney, Agent, or Firm* — Hauptman Ham, LLP (57) ABSTRACT

A temperature control method is used for controlling a temperature of an electric storage device 5 mounted on a vehicle 1 at the time when the vehicle 1 runs on a track 2. In the method, when a minimum voltage value $V_{min}$ corresponding to an internal resistance R of the electric storage device 5 reaches a first predetermined voltage value $V_p$ near a minimum allowable voltage value VL of the electric storage device 5, the electric storage device 5 is controlled such that the electric storage device 5 has a temperature at which the minimum voltage value $V_{min}$ is maintained at the first predetermined voltage value $V_p$.

4 Claims, 4 Drawing Sheets

(51) Int. Cl.
B60L 11/18 (2006.01)
H01M 10/48 (2006.01)
H01M 10/625 (2014.01)
H01M 10/6563 (2014.01)
H01M 10/613 (2014.01)

(52) U.S. Cl.
CPC .......... *H01M10/486* (2013.01); *H01M 10/613* (2015.04); *H01M 10/625* (2015.04); *H01M 10/6563* (2015.04); *B60L 2200/26* (2013.01); *B60L 2240/545* (2013.01); *Y02T 10/705* (2013.01); *Y02T 10/7005* (2013.01)

(56) References Cited

U.S. PATENT DOCUMENTS

| | | | |
|---|---|---|---|
| 2005/0196662 A1* | 9/2005 | Prema et al. | 429/50 |
| 2007/0285060 A1* | 12/2007 | Zettel et al. | 320/132 |
| 2008/0012535 A1* | 1/2008 | Takatsuji et al. | 320/150 |

OTHER PUBLICATIONS

Energizer. (2005). Battery Internal Resistance.*

"Battery Internal Resistance", MECO, www.mecoinst.com; no date available.*

"Online Monitoring of Lithium-ion Batter Aging Effects by Internal Resistance Estimation in Electric Vehicles", Liu et al., Proceedings of the 31st Chinese Control Conference, Jul. 25-27, 2012.*

Japanese Office Action dated Dec. 4, 2009, in connection with the corresponding Japanese Patent Application No. 2009-056357.

International Search Report for PCT/JP2009/066219 mailed Dec. 8, 2009.

Notification of the decision to grant a patent right, dated Oct. 31, 2013 corresponds to Chinese Patent Application No. 200980153398.X.

Notice of Allowance granted May 2, 2013 corresponds to Taiwanese patent application No. 098129747.

Taiwanese Office Action corresponding to TW098129747, dated Oct. 24, 2012.

* cited by examiner

TEMPERATURE CONTROL METHOD AND TEMPERATURE CONTROLLER

RELATED APPLICATIONS

The present application is a National Phase of International Application Number PCT/JP2009/066219, filed Sep. 17, 2009 and claims priority from, Japanese Application Number 2009-056357, filed Mar. 10, 2009.

TECHNICAL FIELD

The present invention relates to a transportation system, without a contact wire, in which a vehicle mounted with an electric storage device runs on a track, and in particular, relates to a temperature control method and a temperature controller for controlling a temperature of the electric storage device mounted on the vehicle.

BACKGROUND ART

In recent years, among transportation systems in which a vehicle runs on a set track, a transportation system configured such that a vehicle runs without receiving power supply through contact wires has been put in practical use. Generally, a vehicle for such a transportation system without a contact wire is equipped with an electrical storage device (for example, a battery) for accumulating power, and the vehicle is configured to accumulate power in the electric storage device when the vehicle stops at a station and thereby to run on a set track.

As described above, operations of the vehicle are performed by using power supplied from the electric storage device in the transportation system without the contact wire. Accordingly, in order to perform the operations of the vehicle without trouble, it is necessary to calculate and manage the remaining capacity of the electric storage device.

Thus, there has heretofore been proposed a controller for an electric storage device (for example, Patent Document 1). The controller is configured to calculate the currently remaining capacity of the electric storage device on the basis of current data, voltage data, an amount of self discharge, and the like of the electric storage device.

PRIOR ART DOCUMENT

Patent Document

[Patent Document 1] Japanese Patent Application Publication No. 2005-110559

SUMMARY OF THE INVENTION

Problems to be Solved by the Invention

The electric storage device generally has a maximum allowable voltage value and a minimum allowable voltage value which are set in advance. When the electric storage device goes into such a state that a voltage of the electric storage device falls outside a range between the maximum allowable voltage value and the minimum allowable voltage value, an interlocking function in the electric storage device works to prevent the electric storage device from being used thereafter. Thus, during operations of the vehicle, the voltage of the electric storage device needs to be maintained between the maximum allowable voltage value and the minimum allowable voltage value.

Figure 7:
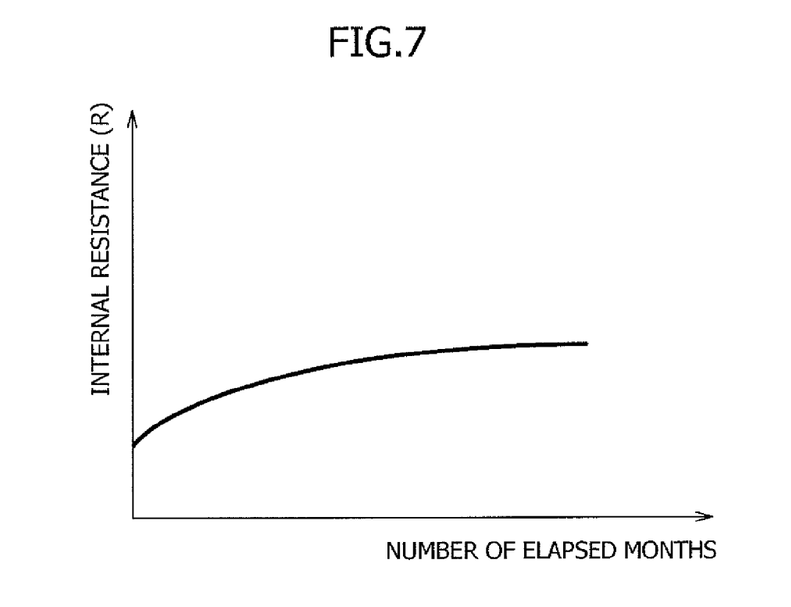
FIG. 7 is a graph showing a relationship between an internal resistance and the number of elapsed months of the electric storage device of the vehicle in the transportation system without the contact wire.
Figure 8:
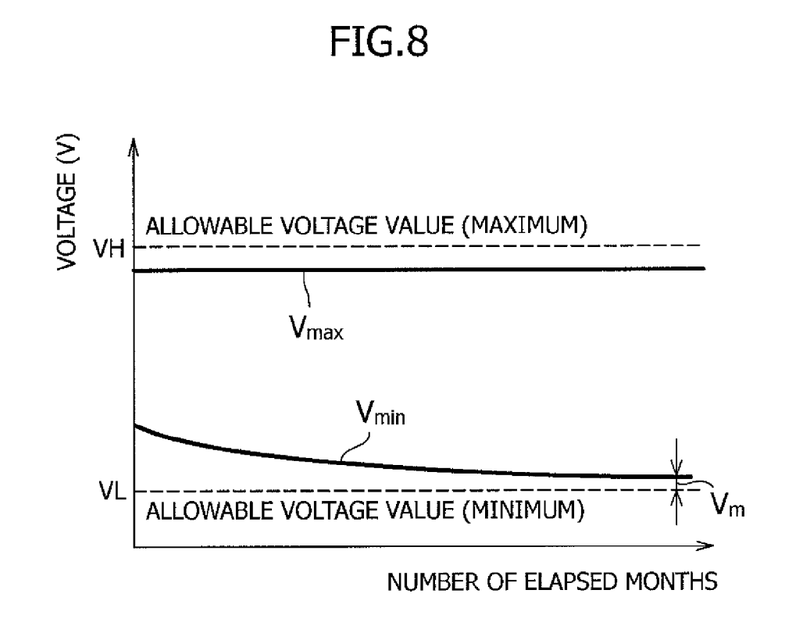
FIG. 8 is a graph showing a relationship between the number of elapsed months and a voltage value of an electric storage device of a vehicle in a conventional transportation system without a contact wire.

However, as shown in FIG. 7, continuous use of the electric storage device causes an internal resistance in the electric storage device to gradually increase over elapsed months, and as the result, the voltage of the electric storage device fluctuates greatly. When the voltage of the electric storage device fluctuates greatly, a minimum voltage value $V_{min}$ of the electric storage device gradually approaches a minimum allowable voltage value VL, and consequently a margin $V_m$, between the minimum voltage value $V_{min}$ and the minimum allowable voltage value VL becomes small, as shown in FIG. 8.

As described above, when the margin between the minimum voltage value and the minimum allowable voltage value VL becomes small, the minimum voltage value of the electric storage device may become less than the minimum allowable voltage value VL, depending on the use state or the environment. Thereby, it becomes more likely that the interlocking function works to prevent the electric storage device from being used. That is, there arises the need for replacing the electric storage device and thus the electric storage device cannot be used over a long time.

The present invention has been made in view of such circumstances and aims to provide a temperature control method and a temperature controller for an electric storage device which are capable of increasing the life of the electric storage device even if an internal resistance of the electric storage device becomes large.

Means for Solving the Problem

In order to solve the problems of the conventional techniques, an embodiment of the present invention provides a temperature control method for controlling a temperature of an electric storage device mounted on a vehicle when the vehicle runs on a track, the method comprising, when a minimum voltage value corresponding to an internal resistance of the electric storage device reaches a first predetermined voltage value near a minimum allowable voltage value of the electric storage device, controlling the electric storage device such that the electric storage device has a temperature at which the minimum voltage value of the electric storage device is maintained at the first predetermined voltage value.

According to another embodiment of the present invention, the method further comprises, when a maximum voltage value corresponding to the internal resistance of the electric storage device reaches a second predetermined voltage value near a maximum allowable voltage value of the electric storage device, controlling the electric storage device such that the electric storage device has a temperature at which the maximum voltage value of the electric storage device is maintained at the second predetermined voltage value.

Another embodiment of the present invention provides a temperature control method for controlling a temperature of an electric storage device mounted on a vehicle when the vehicle runs on a track, the method comprising, at the start of operations of the vehicle, controlling the electric storage device such that the electric storage device has a temperature at which a minimum voltage value corresponding to an internal resistance of the electric storage device becomes equal to a first predetermined voltage value near a minimum allowable voltage value of the electric storage device; and during the operations of the vehicle, controlling the electric storage device such that the electric storage device has a temperature at which the minimum voltage value of the electric storage device is maintained at the first predetermined voltage value.

According to another embodiment of the present invention, the method further comprises, at the start of operations of the vehicle, controlling the electric storage device such that the electric storage device has a temperature at which a maximum voltage value corresponding to the internal resistance of the electric storage device becomes equal to a second predetermined voltage value near a maximum allowable voltage value of the electric storage device; and during the operations of the vehicle, controlling the electric storage device such that the electric storage device has a temperature at which the maximum voltage value of the electric storage device is maintained at the second predetermined voltage value.

Another embodiment of the present invention provides a transportation system without a contact wire comprising a vehicle running on a track, the vehicle being provided with an electric storage device. In the transportation system, the electric storage device includes a temperature controller, and when the minimum voltage value corresponding to an internal resistance of the electric storage device reaches the first predetermined voltage value near the minimum allowable voltage value of the electric storage device, the temperature controller controls the electric storage device such that the electric storage device has a temperature at which the minimum voltage value of the electric storage device is maintained at the first predetermined voltage value.

According to another embodiment of the present invention, the temperature controller controls the electric storage device such that the electric storage device has a temperature at which a maximum voltage value corresponding to the internal resistance of the electric storage device is maintained at a second predetermined voltage value near a maximum allowable voltage value of the electric storage device when the maximum voltage value becomes equal to the second predetermined voltage value.

Another embodiment of the present invention provides a transportation system without a contact wire comprising a vehicle running on a track, the vehicle being provided with an electric storage device. In the transportation system, the electric storage device includes a temperature controller, and at start of operations of the vehicle, the temperature controller controls the electric storage device such that the electric storage device has a temperature at which a minimum voltage value corresponding to an internal resistance of the electric storage device becomes equal to a first predetermined voltage value near a minimum allowable voltage value of the electric storage device, and during the operations of the vehicle, the temperature controller controls the electric storage device such that the electric storage device has a temperature at which the minimum voltage value of the electric storage device is maintained at the first predetermined voltage value.

According to another embodiment of the present invention, at the start of operations of the vehicle, the temperature controller controls the electric storage device such that the electric storage device has a temperature at which a maximum voltage value corresponding to the internal resistance of the electric storage device becomes equal to a second predetermined voltage value near a maximum allowable voltage value of the electric storage device, and during the operations of the vehicle, the temperature controller controls the electric storage device such that the electric storage device has a temperature at which the maximum voltage value of the electric storage device is maintained at the second predetermined voltage value.

Effects of the Invention

A temperature control method according to the present invention is a temperature control method for controlling a temperature of an electric storage device mounted on a vehicle when the vehicle runs on a track, the method comprising, when a minimum voltage value corresponding to an internal resistance of the electric storage device reaches a first predetermined voltage value near a minimum allowable voltage value of the electric storage device, controlling the electric storage device such that the electric storage device has a temperature at which the minimum voltage value of the electric storage device is maintained at the first predetermined voltage value. Accordingly, even if the voltage of the electric storage device starts to fluctuate greatly with the increase of the internal resistance of the electric storage device, the minimum voltage value of the electric storage device is maintained with a predetermined margin secured with respect to the minimum allowable voltage value of the electric storage device. Thus, there is no possibility that the minimum voltage value of the electric storage device being less than the minimum allowable voltage value, depending on the use state or the environment. This makes it possible to use the electric storage device within a range between the allowable voltage values over a longer time period than a conventional device and to increase the life (durable period) of the electric storage device.

According to the temperature control method of the present invention, the method further comprising, when a maximum voltage value corresponding to the internal resistance of the electric storage device reaches a second predetermined voltage value near a maximum allowable voltage value of the electric storage device, controlling the electric storage device such that the electric storage device has a temperature at which the maximum voltage value of the electric storage device is maintained at the second predetermined voltage value. Accordingly, even if the voltage of the electric storage device fluctuates greatly with the increase of the internal resistance of the electric storage device in such an operational environment that a voltage value at the time of regeneration reaches the maximum voltage value of the electric storage device, the maximum voltage value of the electric storage device is maintained with a predetermined margin secured with respect to the maximum allowable voltage value of the electric storage device. Thus, there is no possibility that the maximum voltage value of the electric storage device will be greater than the maximum allowable voltage value, depending on the use state or the environment. This makes it possible to use the electric storage device within a range between the allowable voltage values over a longer time period than a conventional device and to increase the life (durable period) of the electric storage device.

A temperature control method of the present invention is a temperature control method for controlling a temperature of an electric storage device mounted on a vehicle when the vehicle runs on a track, the method comprising, at the start of operations of the vehicle, controlling the electric storage device such that the electric storage device has a temperature at which a minimum voltage value corresponding to an internal resistance of the electric storage device becomes equal to a first predetermined voltage value near a minimum allowable voltage value of the electric storage device; and during the operations of the vehicle, controlling the electric storage device such that the electric storage device has a temperature at which the minimum voltage value of the electric storage device is maintained at the first predetermined voltage value. Accordingly, the minimum voltage value of the electric storage device is constantly maintained from the start of the operations of the vehicle with a predetermined margin secured with respect to the minimum allowable voltage value of the electric storage device. Thus, there is no possibility that the minimum voltage value of the electric storage device will be less than the minimum allowable voltage value, depending on the use state or the environment. This makes it possible to use the electric storage device within a range between the allowable voltage values over a longer time period than a conventional device.

In particular, the temperature of the electric storage device is controlled at the start of operations of the vehicle so that the minimum voltage value of the electric storage device can be equal to a predetermined voltage value near the minimum allowable voltage value of the electric storage device. The control slows down deterioration of the electric storage device for a certain time period from the start of operations, and as the result, the life of the electric storage device can be increased further.

According to the temperature control method of the present invention, the method further comprising, at the start of operations of the vehicle, controlling the electric storage device such that the electric storage device has a temperature at which a maximum voltage value corresponding to the internal resistance of the electric storage device becomes equal to a second predetermined voltage value near a maximum allowable voltage value of the electric storage device; and during the operations of the vehicle, controlling the electric storage device such that the electric storage device has a temperature at which the maximum voltage value of the electric storage device is maintained at the second predetermined voltage value. Accordingly, even if the voltage of the electric storage device fluctuates greatly with the increase of the internal resistance of the electric storage device in such an operational environment that a voltage value at the time of regeneration reaches the maximum voltage value of the electric storage device, the maximum voltage value of the electric storage device is constantly maintained from the start of the operation of the vehicle with a predetermined margin secured with respect to the maximum allowable voltage value of the electric storage device. Thus, there is no possibility that the maximum voltage value of the electric storage device will be greater than the maximum allowable voltage value, depending on the use state or the environment. This makes it possible to use the electric storage device within a range between the allowable voltage values over a longer time period than a conventional device.

A transportation system without a contact wire according to the present invention comprises a vehicle running on a track, the vehicle being provided with an electric storage device. In the transportation system, the electric storage device includes a temperature controller, and when the minimum voltage value corresponding to an internal resistance of the electric storage device reaches the first predetermined voltage value near the minimum allowable voltage value of the electric storage device, the temperature controller controls the electric storage device such that the electric storage device has a temperature at which the minimum voltage value of the electric storage device is maintained at the first predetermined voltage value. Accordingly, even if the voltage of the electric storage device fluctuates greatly with the increase of the internal resistance of the electric storage device, the minimum voltage value of the electric storage device is maintained with a predetermined margin secured with respect to the minimum allowable voltage value of the electric storage device. Thus, there is no possibility that the minimum voltage value of the electric storage device will be less than the minimum allowable voltage value, depending on the use state or the environment. This makes it possible to use the electric storage device within a range between the allowable voltage values over a longer time period than a conventional device and to increase the life of the electric storage device.

According to a transportation system of the present invention, the temperature controller controls the electric storage device such that the electric storage device has a temperature at which a maximum voltage value corresponding to the internal resistance of the electric storage device is maintained at a second predetermined voltage value near a maximum allowable voltage value of the electric storage device when the maximum voltage value of the electric storage device becomes equal to the second predetermined voltage value. Accordingly, even if the voltage of the electric storage device fluctuates greatly with the increase of the internal resistance of the electric storage device in such an operational environment that a voltage value at the time of regeneration reaches the maximum voltage value of the electric storage device, the maximum voltage value of the electric storage device is maintained with a predetermined margin secured with respect to the maximum allowable voltage value of the electric storage device. Thus, there is no possibility that the maximum voltage value of the electric storage device will be greater than the maximum allowable voltage value, depending on the use state or the environment. This makes it possible to use the electric storage device within a range between the allowable voltage values over a longer time period than a conventional device and to increase the life (durable period) of the electric storage device.

A transportation system without a contact wire according to the present invention comprises a vehicle running on a track, the vehicle being provided with an electric storage device. In the transportation system, the electric storage device includes a temperature controller, and at start of operations of the vehicle, the temperature controller controls the electric storage device such that the electric storage device has a temperature at which a minimum voltage value corresponding to an internal resistance of the electric storage device becomes equal to a first predetermined voltage value near a minimum allowable voltage value of the electric storage device, and during the operations of the vehicle, the temperature controller controls the electric storage device such that the electric storage device has a temperature at which the minimum voltage value of the electric storage device is maintained at the first predetermined voltage value. Accordingly, the minimum voltage value of the electric storage device is constantly maintained from the start of the operations of the vehicle with a predetermined margin secured with respect to the minimum allowable voltage value of the electric storage device. Thus, there is no possibility that the minimum voltage value of the electric storage device will be less than the minimum allowable voltage value, depending on the use state or the environment. This makes it possible to use the electric storage device within a range between the allowable voltage values over a longer time period than a conventional device.

In particular, the temperature of the electric storage device is controlled at the start of operations of the vehicle so that the minimum voltage value of the electric storage device can be equal to a predetermined voltage value near the minimum allowable voltage value of the electric storage device. The control slows down deterioration of the electric storage device for a certain time period from the start of operations, and as a result, the life of the electric storage device can be increased further.

According to the transportation system of the present invention, at the start of operations of the vehicle, the temperature controller controls the electric storage device such that the electric storage device has a temperature at which a maximum voltage value corresponding to the internal resistance of the electric storage device becomes equal to a second predetermined voltage value near a maximum allowable voltage value of the electric storage device, and during the operations of the vehicle, the temperature controller controls the electric storage device such that the electric storage device has a temperature at which the maximum voltage value of the electric storage device is maintained at the second predetermined voltage value. Accordingly, even if the voltage of the electric storage device fluctuates greatly with the increase of the internal resistance of the electric storage device in such an operational environment that a voltage value at the time of regeneration reaches the maximum voltage value of the electric storage device, the maximum voltage value of the electric storage device is constantly maintained from the start of the operations of the vehicle with a predetermined margin secured with respect to the maximum allowable voltage value of the electric storage device. Thus, there is no possibility that the maximum voltage value of the electric storage device will be greater than the maximum allowable voltage value, depending on the use state or the environment. This makes it possible to use the electric storage device within a range between the allowable voltage values over a longer time period than a conventional device.

BRIEF DESCRIPTION OF THE DRAWINGS

FIG. 6 is a graph showing a relationship between a voltage value and the number of elapsed months of the electric storage device at the time of implementing the temperature control method according to the second embodiment of the present invention.

MODES FOR CARRYING OUT THE INVENTION

Figure 1:
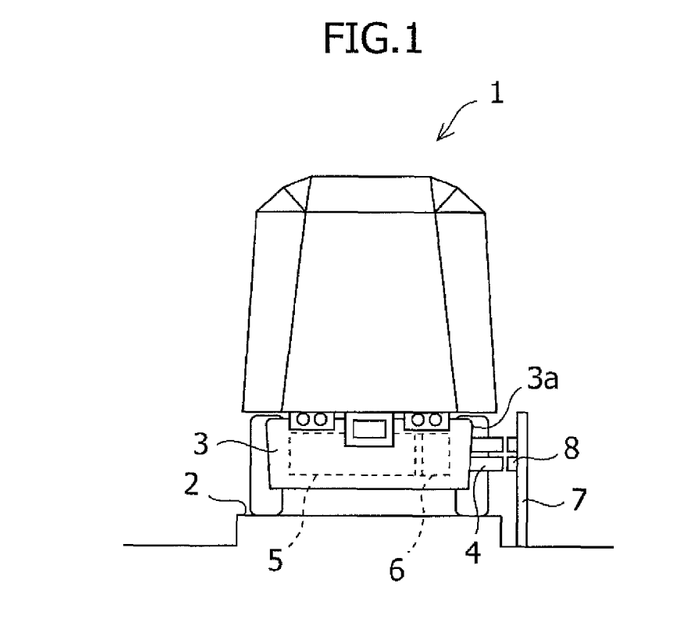
FIG. 1 is a diagram of a vehicle of a transportation system without a contact wire according to embodiments of the present invention, viewed from a running direction.

Hereinafter, a vehicle of a transportation system without a contact wire according to embodiments of the present invention will be described by referring to the drawings. FIG. 1 is a diagram of a vehicle of a transportation system without a contact wire according to embodiments of the present invention, viewed from a running direction.

As shown in FIG. 1, a vehicle 1 in a transportation system without a contact wire according to the embodiments of the present invention includes a truck 3 which runs on a predetermined track 2. A collection contactor 4 for receiving power is provided on a side surface 3a of the truck 3. The truck 3 is also provided with an electric storage device 5 for accumulating power received by the collection contactor 4. The vehicle 1 is configured to accumulate the power in the electric storage device 5 when the vehicle 1 stops at a station (not shown), and thereby to run on the track 2 set therefor.

In embodiments of the present invention, the electric storage device 5 includes a temperature controller 6 configured to control a temperature of the electric storage device 5 during operations of the vehicle 1, as shown in FIG. 1. Note that as the temperature controller 6, for example, a cooling fan or the like for lowering the temperature of the electric storage device 5 can be used.

Figure 3:
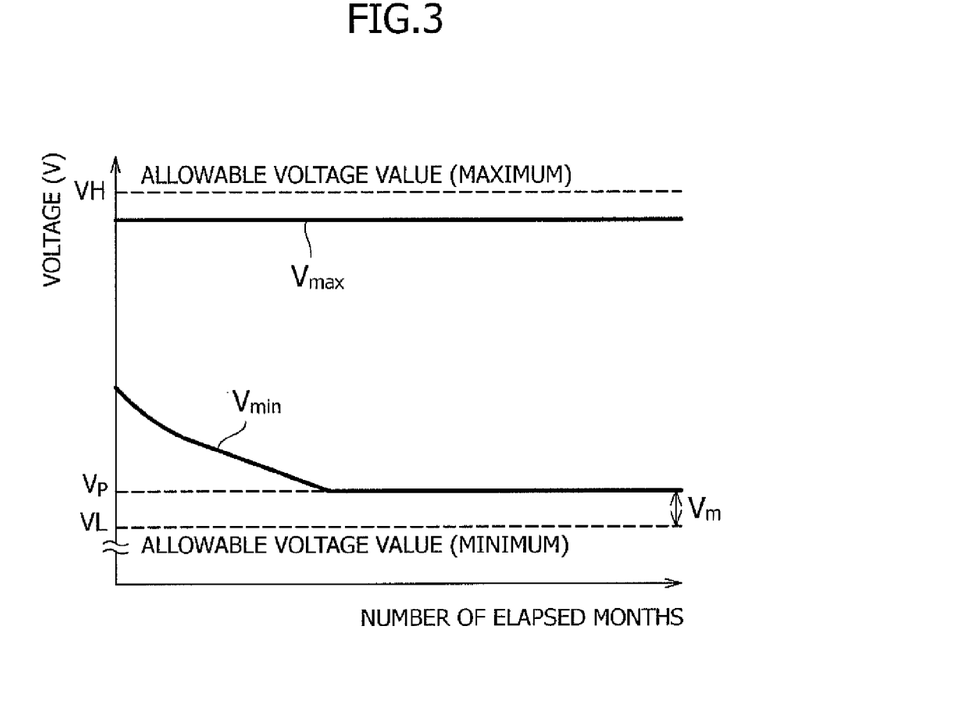
FIG. 3 is a graph showing a relationship between a voltage value and the number of elapsed months of the electric storage device at the time of implementing the temperature control method according to the first embodiment of the present invention.

In addition, the electric storage device 5 has a maximum allowable voltage value VH and the minimum allowable voltage value VL, as allowable voltage values, which are set in advance (see FIG. 3). The electric storage device 5 is not allowed to supply power when an interlocking function (not shown) works after a voltage value of the electric storage device 5 continuously stays outside a range between the maximum allowable voltage value VH and the minimum allowable voltage value VL.

In contrast, on the ground side, a supporting frame 7 standing adjacent to the track 2 is provided. The supporting frame 7 is provided with a power feeding contactor 8 located to face the collection contactor 4 at the time when the vehicle 1 stops. The power feeding contactor 8 is connected to a charger (not shown) provided above the ground, through a power line (not shown) embedded in the ground.

With such a configuration, when the vehicle 1 stops at the station, the collection contactor 4 and the power feeding contactor 8 are brought into contact with each other, and thereby power supplied from the charger above the ground is accumulated in the electric storage device 5.

First Embodiment

Figure 2:
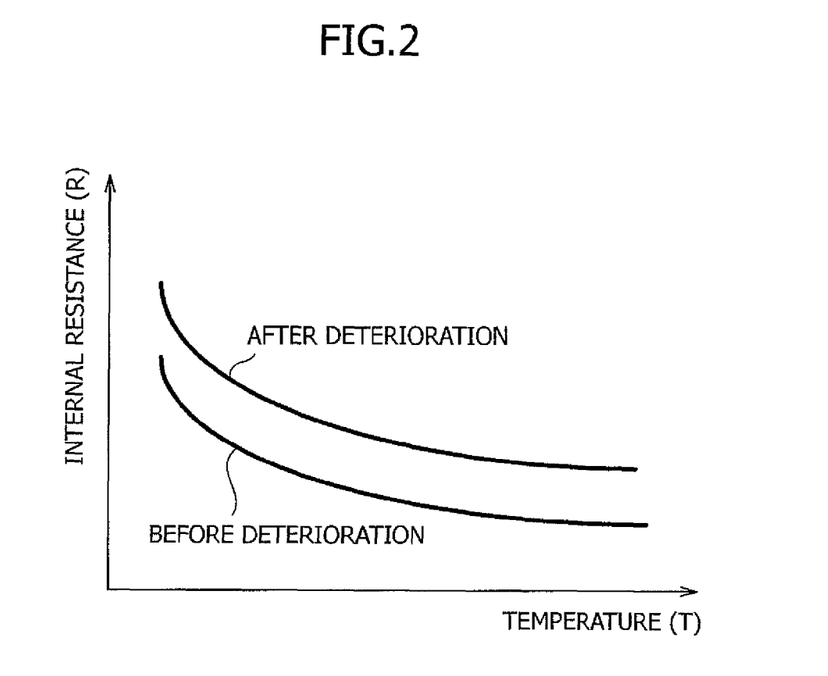
FIG. 2 is a graph showing a relationship between an internal resistance and a temperature of the electric storage device of the vehicle in the transportation system without the contact wire.
Figure 4:
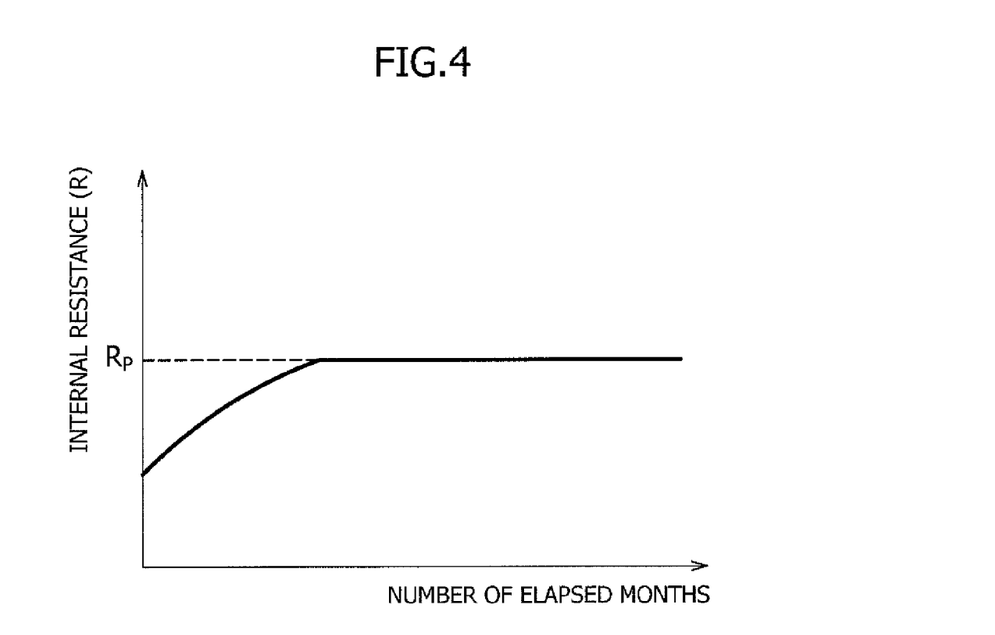
FIG. 4 is a graph showing a relationship between an internal resistance and the number of elapsed months at the time of implementing a temperature control method according to a first embodiment of the present invention.

Hereinafter, a method for controlling a temperature of an electric storage device according to a first embodiment of the present invention will be described by referring to the drawings. FIG. 2 is a graph showing a relationship between an internal resistance and a temperature of the electric storage device of the vehicle in the transportation system without the contact wire. FIG. 3 is a graph showing a relationship between an internal resistance and the number of elapsed months at the time of implementing the temperature control method according to the first embodiment. FIG. 4 is a graph showing a relationship between a voltage value and the number of elapsed months of the electric storage device at the time of implementing the temperature control method according to the first embodiment of the present invention.

In the first place, a relationship between an internal resistance R and a temperature T in the electric storage device 5 will be described by using FIG. 2.

As shown in FIG. 2, the relationship between the internal resistance R and the temperature T in the electric storage device 5 exhibits such a relationship that the internal resistance R lowers as the temperature T rises. In addition, as shown by the curve after deterioration in FIG. 2, when the deterioration of the electric storage device 5 increases, the curve showing the relationship between the internal resistance R and the temperature T shifts upwards to a larger degree than the curve before the deterioration does. That is, the relationship between the deterioration and the internal resistance R in the electric storage device 5 has such a relationship that the internal resistance R increases as the deterioration of the electric storage device 5 increases.

Hence, in this embodiment, the temperature controller 6 maintains constant the internal resistance R of the electric storage device 5 by controlling the temperature of the electric storage device 5 on the basis of the relationship between the internal resistance R and the temperature T in the electric storage device 5.

Next, a concrete method for controlling the temperature of the electric storage device 5 will be described by using FIGS. 3 and 4.

In this embodiment, as shown in FIG. 3, when the minimum voltage value corresponding to the internal resistance R of the electric storage device 5 reaches a predetermined voltage value (first predetermined voltage value) near the minimum allowable voltage value VL of the electric storage device 5, the temperature controller 6 controls the temperature of the electric storage device 5 so that the minimum voltage value $V_{min}$ of the electric storage device 5 can be maintained at the predetermined voltage value $V_p$. Specifically, since the internal resistance R gradually increases in the electric storage device 5 with deterioration thereof (see FIG. 2), the temperature controller 6 maintains the internal resistance R of the electric storage device 5 at a value $R_p$ corresponding to the predetermined voltage value $V_p$ by gradually raising the temperature of the electric storage device 5 (see FIG. 4).

The internal resistance R of the electric storage device 5 is maintained at the value $R_p$ corresponding to the predetermined voltage value $V_p$ as described above, and thereby the minimum voltage value $V_{min}$ of the electric storage device 5 is maintained with the predetermined margin $V_m$ secured with respect to the minimum allowable voltage value VL, as shown in FIG. 3.

Note that in this embodiment, the predetermined voltage value $V_p$ near the minimum allowable voltage value VL of the electric storage device 5 may be set at a value of, for example, 110% to 120% of the minimum allowable voltage value VL.

As described above, in the temperature control method according to this embodiment, when the minimum voltage value $V_{min}$ corresponding to the internal resistance R of the electric storage device 5 reaches the predetermined voltage value $V_p$ near the minimum allowable voltage value. VL of the electric storage device 5, the electric storage device 5 is controlled such that the electric storage device 5 has a temperature at which the minimum voltage value $V_{min}$ of the electric storage device 5 is maintained at the predetermined voltage value $V_p$. Thus, even if the voltage of the electric storage device 5 fluctuates greatly with the increase of the internal resistance R of the electric storage device 5, the minimum voltage value $V_{min}$ of the electric storage device 5 is maintained with the predetermined margin $V_m$ secured with respect to the minimum allowable voltage value VL of the electric storage device 5. Accordingly, there is no possibility that the minimum voltage value $V_{min}$ of the electric storage device 5 will be less than the minimum allowable voltage value VL, depending on the use state or the environment. This makes it possible to use the electric storage device 5 within a range between the allowable voltage values over a longer time period than a conventional device and to increase the life of the electric storage device 5.

Second Embodiment

Figure 5:
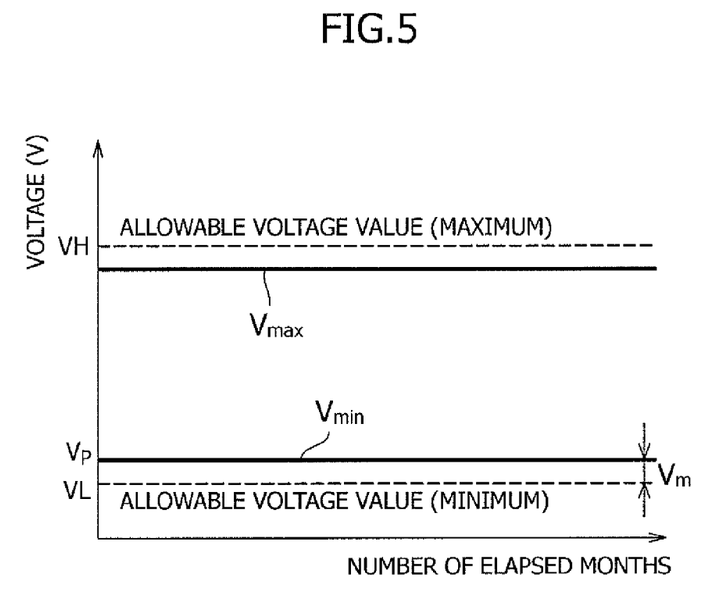
FIG. 5 is a graph showing a relationship between a voltage value and the number of elapsed months of the electric storage device at the time of implementing the temperature control method according to the second embodiment of the present invention.
Figure 6:
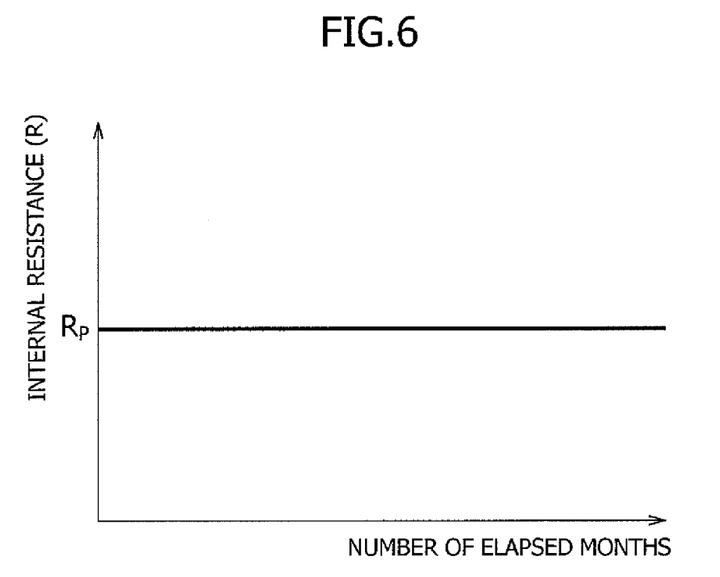
FIG. 6 is a graph showing a relationship between an internal resistance and the number of elapsed months at the time of implementing a temperature control method according to a second embodiment of the present invention.

Hereinafter, a method for controlling a temperature of an electric storage device according to a second embodiment of the present invention will be described by referring to the drawings. FIG. 6 is a graph showing a relationship between an internal resistance and the number of elapsed months at the time of implementing the temperature control method according to the second embodiment. FIG. 5 is a graph showing a relationship between a voltage value and the number of elapsed months of the electric storage device at the time of implementing the temperature control method according to the second embodiment of the present invention.

In this embodiment, at the start of operations of the vehicle 1, the temperature controller 6 controls the temperature of the electric storage device 5 so that the minimum voltage value $V_{min}$ corresponding to the internal resistance R of the electric storage device 5 can reach the predetermined voltage value $V_p$ near the minimum allowable voltage value VL of the electric storage device 5, as shown in FIG. 5. Specifically, since the electric storage device 5 has not been deteriorated at the start of operations, the temperature controller 6 sets the internal resistance R of the electric storage device 5 at the value $R_p$ corresponding to the predetermined voltage value $V_p$ by lowering the temperature of the electric storage device 5 (see FIG. 6).

The internal resistance R of the electric storage device 5 is set at the value $R_p$ corresponding to the predetermined voltage value $V_p$ as described above, and thereby the minimum voltage value $V_{min}$ of the electric storage device 5 is set at the start of operations of vehicle 1 with the predetermined margin $V_m$ secured with respect to the minimum allowable voltage value VL, as shown in FIG. 5.

Then, the temperature controller 6 controls the temperature of the electric storage device 5 so that the minimum voltage value $V_{min}$ of the electric storage device 5 can be maintained at the predetermined voltage value $V_p$. Specifically, since the internal resistance R gradually increases in the electric storage device 5 with deterioration thereof (see FIG. 2), the temperature controller 6 maintains the internal resistance R of the electric storage device 5 at a value $R_p$ corresponding to the predetermined voltage value $V_p$ by gradually raising the temperature of the electric storage device 5 (see FIG. 6).

In this manner, the internal resistance R of the electric storage device 5 is maintained from the start of the operations of the vehicle 1 at the value $R_p$ corresponding to the predetermined voltage value $V_p$ as shown in FIG. 5, and thereby the minimum voltage value $V_{min}$ of the electric storage device 5 is constantly maintained from the start of the operations of the vehicle 1 with the predetermined margin $V_m$ secured with respect to the minimum allowable voltage value VL.

Note that in this embodiment, the predetermined voltage value $V_p$ near the minimum allowable voltage value VL of the electric storage device 5 may be set at a value of, for example, 110% to 120% of the minimum allowable voltage value VL.

As described above, in the temperature control method according to this embodiment, at the start of the operations of the vehicle 1, the electric storage device 5 is controlled such that the electric storage device 5 has a temperature at which the minimum voltage value $V_{min}$ corresponding to the internal resistance R of the electric storage device 5 becomes the predetermined voltage value $V_p$ near the minimum allowable voltage value VL of the electric storage device 5. Moreover, during the operations of the vehicle 1, the electric storage device 5 is controlled such that such that the electric storage device 5 has a temperature at which the minimum voltage value $V_{min}$ of the electric storage device 5 is maintained at the predetermined voltage value $V_p$. Thus, the minimum voltage value $V_{min}$ of the electric storage device 5 is constantly maintained from the start of the operations of the vehicle 1 with the predetermined margin $V_m$ secured with respect to the minimum allowable voltage value VL of the electric storage device 5. Accordingly, there is no possibility that the minimum voltage value $V_{min}$ of the electric storage device 5 will be less than the minimum allowable voltage value VL, depending on the use state or the environment. This makes it possible to use the electric storage device 5 within a range between the allowable voltage values over a longer time period than a conventional device.

Meanwhile, further specifically referring to the relationship between the deterioration and the temperature of the electric storage device 5, it has been known that the lower the temperature is set for the electric storage device 5, the slower the electric storage device 5 deteriorates.

In this embodiment, the temperature of the electric storage device 5 is set low at the start of operations of the vehicle 1 so that the minimum voltage value $V_{min}$ of the electric storage device 5 can reach the predetermined voltage value $V_p$ near the minimum allowable voltage value VL of the electric storage device 5. Thus, in a certain time period (a period until the temperature is raised) from the start of operations, the deterioration of the electric storage device 5 slows down, and consequently the life of the electric storage device 5 can be increased.

The embodiments of the present invention have been described above; however, the present invention is not limited to the aforementioned embodiments. Various variations and modifications can be made based on the technical idea of the present invention.

In many cases, a maximum voltage value $V_{max}$ of the electric storage device 5 is generally exhibited in a set voltage at the time of charging. However, in some cases depending on an operational environment of the vehicle (such as a case in which there is an incline, for example), the maximum voltage value may be exhibited at the time of regeneration braking.

In such an operational environment, when the voltage of the electric storage device 5 fluctuates greatly with the increase of the internal resistance of the electric storage device 5, the maximum voltage value $V_{max}$ gradually approaches the maximum allowable voltage value VH, and consequently a margin between the maximum voltage value $V_{max}$ and the maximum allowable voltage value VH becomes small. Accordingly, in such an operational environment, the temperature controller 6 may control both the minimum voltage value $V_{min}$ and the maximum voltage value $V_{max}$.

Note that the temperature controller 6 can also control a maximum voltage value $V_{max}$ in the same manner as for the minimum voltage value $V_{min}$. In other words, the temperature controller 6 controls the temperature of the electric storage device 5 on the basis of the aforementioned relationship between the internal resistance R and the temperature T in the electric storage device 5.

As an embodiment, for example, the temperature controller 6 may control the temperature of the electric storage device 5 when the maximum voltage value $V_{max}$ corresponding to the internal resistance R of the electric storage device 5 reaches a predetermined voltage value (second predetermined voltage value) near the maximum allowable voltage value VH of the electric storage device 5. The control is performed so that the maximum voltage value $V_{max}$ of the electric storage device 5 can be maintained at the predetermined voltage value.

In addition, as another embodiment, the temperature controller 6 may control the temperature of the electric storage device 5 at the start of operations of vehicle 1 so that the maximum voltage value $V_{max}$ corresponding to the internal resistance R of the electric storage device 5 can reach a predetermined voltage value near the maximum allowable voltage value VH of the electric storage device 5, and the temperature controller 6 may further control the temperature of the electric storage device 5 during the operations of the vehicle 1 so that the maximum voltage value $V_{max}$ of the electric storage device 5 can be maintained at the predetermined voltage value.

Note that in the case of controlling the maximum voltage value $V_{max}$, the predetermined voltage value near the maximum allowable voltage value VH of the electric storage device 5 may be set at a value of for example, 80% to 90% of the maximum allowable voltage value VH.

EXPLANATION OF THE REFERENCE NUMERALS 1 vehicle
2 track
3 truck
3a side surface of truck
4 collection contactor
5 electric storage device
6 temperature controller
7 supporting frame
8 power feeding contactor
VL minimum allowable voltage value
VH maximum allowable voltage value
$V_{min}$ minimum voltage value of electric storage device
$V_{max}$ maximum voltage value of electric storage device
$V_m$ margin between minimum voltage value and minimum allowable voltage value in electric storage device
$V_p$ predetermined voltage value
R internal resistance of electric storage device
$R_p$ Internal resistance value corresponding to $V_p$

The invention claimed is:

1. A temperature control method for controlling a temperature of an electric storage device mounted on a vehicle when the vehicle runs on a track,
   wherein the electric storage has such a characteristic that an internal resistance lowers as the temperature rises and the internal resistance increases as deterioration of the electric storage device increases at the same temperature,
   the method comprising:
   when a minimum voltage value corresponding to an internal resistance of the electric storage device reaches a first predetermined voltage value near a minimum allowable voltage value of the electric storage device, a first step of controlling the electric storage device such that the electric storage device has a temperature at which the minimum voltage value of the electric storage device is maintained at the first predetermined voltage value; and
   when a maximum voltage value corresponding to the internal resistance of the electric storage device reaches a second predetermined voltage value near a maximum allowable voltage value of the electric storage device at the time of regeneration braking of the vehicle, a second step of controlling the electric storage device such that the electric storage device has a temperature at which the maximum voltage value of the electric storage device is maintained at the second predetermined voltage value,
   wherein the first step is to raise the temperature of the electric storage device with the deterioration of the electric storage device so as to maintain the minimum voltage value of the electric storage device at the first predetermined voltage value,
wherein the first predetermined voltage value is set at a value of 110% to 120% of the minimum allowable voltage value,
wherein the second step is to raise the temperature of the electric storage device with the deterioration of the electric storage device so as to maintain the maximum voltage value of the electric storage device at the second predetermined voltage value, and
wherein the second predetermined voltage value is set at a value of 80% to 90% of the maximum allowable voltage value.

2. A temperature control method for controlling a temperature of an electric storage device mounted on a vehicle when the vehicle runs on a track,
wherein the electric storage has such a characteristic that an internal resistance lowers as the temperature rises and the internal resistance increases as deterioration of the electric storage device increases at the same temperature,
the method comprising:
at the start of operations of the vehicle, a first step of controlling the electric storage device such that the electric storage device has a temperature at which a minimum voltage value corresponding to an internal resistance of the electric storage device becomes equal to a first predetermined voltage value near a minimum allowable voltage value of the electric storage device; and
during the operations of the vehicle, a second step of controlling the electric storage device such that the electric storage device has a temperature at which the minimum voltage value of the electric storage device is maintained at the first predetermined voltage value, wherein the first step is to lower the temperature of the electric storage device so that the minimum voltage value of the electric storage device reaches the first predetermined voltage value;
at the start of operations of the vehicle, a third step of controlling the electric storage device such that the electric storage device has a temperature at which a maximum voltage value corresponding to the internal resistance of the electric storage device becomes equal to a second predetermined voltage value near a maximum allowable voltage value of the electric storage device; and
at the time of regeneration braking during the operations of the vehicle, a fourth step of controlling the electric storage device such that the electric storage device has a temperature at which the maximum voltage value of the electric storage device is maintained at the second predetermined voltage value,
wherein the second step is to raise the temperature of the electric storage device with the deterioration of the electric storage device so as to maintain the minimum voltage value of the electric storage device at the first predetermined voltage value,
wherein the first predetermined voltage value is set at a value of 110 to 120% of the minimum allowable voltage value,
wherein the third step is to lower the temperature of the electric storage device so that the maximum voltage value of the electric storage device reaches the second predetermined voltage value,
wherein the fourth step is to raise the temperature of the electric storage device with the deterioration of the electric storage device so as to maintain the maximum voltage value of the electric storage device at the second predetermined voltage value, and
wherein the second predetermined voltage value is set at a value of 80% to 90% of the maximum allowable voltage value.

3. A temperature controller for controlling a temperature of an electric storage device mounted on a vehicle when the vehicle runs on a track,
wherein the electric storage has such a characteristic that an internal resistance lowers as the temperature rises and the internal resistance increases as deterioration of the electric storage device increases at the same temperature,
the temperature controller comprising:
first means for controlling the electric storage device such that the electric storage device has a temperature at which the minimum voltage value of the electric storage device is maintained at the first predetermined voltage value when the minimum voltage value corresponding to an internal resistance of the electric storage device reaches the first predetermined voltage value near the minimum allowable voltage value of the electric storage device; and
a second means for controlling the electric storage device such that the electric storage device has a temperature at which a maximum voltage value corresponding to the internal resistance of the electric storage device is maintained at a second predetermined voltage value near a maximum allowable voltage value of the electric storage device when the maximum voltage value of the electric storage device becomes equal to the second predetermined voltage value at the time of regeneration braking of the vehicle,
wherein the first means is configured to raise the temperature of the electric storage device with the deterioration of the electric storage device so as to maintain the minimum voltage value of the electric storage device at the first predetermined voltage value,
wherein the first predetermined voltage value is set at a value of 110% to 120% of the minimum allowable voltage value,
wherein the second means is configured to raise the temperature of the electric storage device with the deterioration of the electric storage device so as to maintain the maximum voltage value of the electric storage device at the second predetermined voltage value, and
wherein the second predetermined voltage value is set at a value of 80% to 90% of the maximum allowable voltage value.

4. A temperature controller for controlling a temperature of an electric storage device mounted on a vehicle when the vehicle runs on a track,
wherein the electric storage has such a characteristic that an internal resistance lowers as the temperature rises and the internal resistance increases as deterioration of the electric storage device increases at the same temperature,
the temperature controller comprising:
first means for controlling the electric storage device at start of operations of the vehicle such that the electric storage device has a temperature at which a minimum voltage value corresponding to an internal resistance of the electric storage device becomes equal to a first predetermined voltage value near a minimum allowable voltage value of the electric storage device;

second means for controlling the electric storage device during the operations of the vehicle such that the electric storage device has a temperature at which the minimum voltage value of the electric storage device is maintained at the first predetermined voltage value, wherein the first means is configured to lower the temperature of the electric storage device so that the minimum voltage value of the electric storage device reaches the first predetermined voltage value;

third means for controlling the electric storage device at the start of operations of the vehicle such that the electric storage device has a temperature at which a maximum voltage value corresponding to the internal resistance of the electric storage device becomes equal to a second predetermined voltage value near a maximum allowable voltage value of the electric storage device, and fourth means for controlling the electric storage device at the time of regeneration braking during the operations of the vehicle such that the electric storage device has a temperature at which the maximum voltage value of the electric storage device is maintained at the second predetermined voltage value, wherein the second means is configured to raise the temperature of the electric storage device with the deterioration of the electric storage device so as to maintain the minimum voltage value of the electric storage device at the first predetermined voltage value, wherein the first predetermined voltage value is set at a value of 110% to 120% of the minimum allowable voltage value, wherein the third means is configured to lower the temperature of the electric storage device so that the maximum voltage value of the electric storage device reaches the second predetermined voltage value, wherein the fourth means is configured to raise the temperature of the electric storage device with the deterioration of the electric storage device so as to maintain the maximum voltage value of the electric storage device at the second predetermined voltage value, and wherein the second predetermined voltage value is set at a value of 80% to 90% of the maximum allowable voltage value.

* * * * *